(12) United States Patent
Zhu et al.

(10) Patent No.: US 9,780,403 B2
(45) Date of Patent: Oct. 3, 2017

(54) CATHODE SHEET AND LITHIUM ION ELECTRIC ROLL USING THE SAME

(71) Applicant: Dongguan Amperex Technology Limited, Dongguan, Guangdong Province (CN)

(72) Inventors: Junliang Zhu, Dongguan (CN); Haibing Wang, Dongguan (CN); Tongming Dong, Dongguan (CN); Wenqiang Cheng, Dongguan (CN); Baohua Chen, Dongguan (CN); Shufeng Wu, Dongguan (CN); Wei Yang, Dongguan (CN); Zhihua Qin, Dongguan (CN); Meina Lin, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 0 days.

(21) Appl. No.: 15/087,052

(22) Filed: Mar. 31, 2016

(65) Prior Publication Data
US 2017/0170508 A1    Jun. 15, 2017

(30) Foreign Application Priority Data
Dec. 14, 2015  (CN) .......................... 2015 1 0932576

(51) Int. Cl.
*H01M 4/02* (2006.01)
*H01M 10/04* (2006.01)
(Continued)

(52) U.S. Cl.
CPC ... *H01M 10/0431* (2013.01); *H01M 10/0525* (2013.01); *H01M 10/0587* (2013.01); *H01M 2004/028* (2013.01)

(58) Field of Classification Search
CPC ......... H01M 10/0431; H01M 10/0525; H01M 10/0587; H01M 2004/028
See application file for complete search history.

(56) References Cited

U.S. PATENT DOCUMENTS

2014/0193699 A1* 7/2014 Kim ........................ H01M 2/14
429/164

FOREIGN PATENT DOCUMENTS

CN        203150653 U      8/2013

OTHER PUBLICATIONS

Office Action for corresponding Chinese Application No. 201510932576.6 dated Jul. 4, 2017.

* cited by examiner

*Primary Examiner* — Patrick Ryan
*Assistant Examiner* — Ben Lewis
(74) *Attorney, Agent, or Firm* — Carter, DeLuca, Farrell & Schmidt, LLP

(57) ABSTRACT

The present application relates to the filed of energy storage devices, and in particular, relates to a cathode sheet and a lithium ion electric roll using the cathode sheet. The cathode sheet comprises a cathode current collector, an active substance layer, a cathode tab, a head protective adhesive, a tail protective adhesive, an ending adhesive, and an anti-puncture cushion. The cathode current collector comprises a head exposed zone, a head adhesive application zone, a coating zone, a tail adhesive application zone, and a tail exposed zone. The active substance layer covers the coating zone, the head protective adhesive covers the head adhesive application zone, the tail protective adhesive covers the tail adhesive application zone, the ending adhesive is bonded to a tail of the tail exposed zone, and the anti-puncture cushion is connected to the tail exposed zone.

10 Claims, 8 Drawing Sheets

(51) Int. Cl.
*H01M 10/0525* (2010.01)
*H01M 10/0587* (2010.01)

CATHODE SHEET AND LITHIUM ION ELECTRIC ROLL USING THE SAME

TECHNICAL FIELD

The present application relates to the filed of energy storage devices, and in particular, relates to a cathode sheet, and a lithium ion electric roll using the cathode sheet.

BACKGROUND

With the development of science and technology, various electronic products emerge and are almost indispensable in daily life. With advantages of high energy density, long cycle life, environmental friendliness and reproductively, lithium ion batteries have been widely used in various electronic products.

In the related art, a separator is generally used to isolate an anode current collector from a laminated aluminum film. Since the requirements of energy density of an electric roll at the market become higher and higher, a thickness of the separator, a thickness of the polypropylene layer on the laminated aluminum film, and a thickness of the anode current collector become smaller. In one aspect, anti-puncture strengths of the thinned separator and polypropylene layer become lower. In another aspect, since the anode current collector of the lithium ion battery is a copper foil, with the restriction of process conditions in the related art, burrs may present on an end edge of the copper foil, which may cause the case where the burrs on the end edge of the anode puncture the separator and the laminated aluminum film under extreme conditions. However, when the electric roll is formed by winding, corners on two side faces of the thinned anode current collector will become sharper, which increases the probability that the separator and the polypropylene layer of the laminated aluminum film are punctured by the anode current collector. In the related art, the method for isolating the anode sheet from the laminated aluminum film by using the separator is hard to ensure good isolation effects.

The separator and the polypropylene layer of the laminated aluminum film are punctured, which may cause battery leakage, and more seriously may result in that the anode is conducted with the aluminum foil layer via contact. In this case, an electrochemical reaction may occur and thus the polypropylene layer of the laminated aluminum film may be subjected to corrosion, which also causes battery leakage and corrosion.

SUMMARY

The present application provides a cathode sheet, and a lithium ion electric roll using the cathode sheet, which is capable of effectively reducing the probability that a laminated aluminum film is punctured by an anode sheet.

A first aspect of the present application provides a cathode sheet, a cathode current collector, an active substance layer, a cathode tab, a head protective adhesive, a tail protective adhesive, an ending adhesive, and an anti-puncture cushion; wherein: the cathode current collector comprises a first side face and a second side face that deviate from each other, two ends along length directions of the first side face and the second side face being respectively a head and a tail; from the head to the tail, both the first side face and the second side face comprise a head exposed zone, a head adhesive application zone, a coating zone, a tail adhesive application zone, and a tail exposed zone that are sequentially adjacent, the head exposed zone and the head adhesive application zone on two side faces of the cathode current collector being both symmetrically arranged, a length of the coating zone on the first side face being less than a length of the coating zone on the second side face, and a length of the tail exposed zone on the first side face being greater than a length of the tail exposed zone on the second side face; the cathode tab is connected to a domain within the head adhesive application zone of the cathode current collector, the active substance layer covers the coating zone, the head protective adhesive covers the head adhesive application zone and covers the cathode tab, the tail protective adhesive covers the tail adhesive application zone, and the ending adhesive is bonded to a tail end of the tail exposed zone; and the anti-puncture cushion is connected to the tail exposed zone, and extends along a width direction of the cathode current collector; and when a bare electric roll is formed through winding, the anti-puncture cushion is at least capable of staying on an outer side of one corner of an anode current collector.

Preferably, the anti-puncture cushion is connected to a domain relative to the tail exposed zone on the first side face and the coating zone on the second side face; and when the bare electric roll is formed through winding, the anti-puncture cushion is capable of staying on an outer side wall of a second layer of the bare electric roll in an outside-to-inside direction.

Preferably, anti-puncture cushion is connected to a domain relative to the tail exposed zone on the first side face and the coating zone on the second side face; and when the bare electric roll is formed through winding, the anti-puncture cushion is capable of staying on an outer side wall of a second layer of the bare electric roll in an outside-to-inside direction.

Preferably, the anti-puncture cushion is connected to the second side face; and when the bare electric roll is formed through winding, the anti-puncture cushion is capable of staying on an inner side wall of a first layer of the bare electric roll in an outside-to-inside direction.

Preferably, the anti-puncture cushion is capable of staying on outer sides of two corners of an anode current collector when the bare electric roll is formed through winding.

Preferably, the anti-puncture cushion is bonded to the cathode current collector.

Preferably, the anti-puncture cushion comprises two sections of adhesive tapes.

Preferably, the anti-puncture cushion comprises a section of adhesive tape.

Preferably, the adhesive tape is a biaxially oriented polypropylene (BOPP) adhesive tape.

A second aspect of the present application provides a lithium ion electric roll, comprising a laminated aluminum film, and a bare electric roll that is formed by winding an anode sheet, a separator and a cathode sheet as defined above; wherein: in the electric roll, the anode sheet, the separator, and the cathode sheet are arranged in a stacking manner, and the first side face faces towards the separator, an outer side face of the bare electric roll being formed by the ending adhesive, and the tail exposed zone partially located on the second side face, and the anti-puncture cushion staying on an outer side of a corner the anode current collector; and the laminated aluminum film wraps the bare electric roll.

The technical solutions provided in the present application may achieve the following beneficial effects:

In the lithium ion electric roll according to the present application, the tail exposed zone of the cathode sheet is connected to the anti-puncture cushion, and when the bare electric roll is formed through winding, the anti-puncture cushion is just located on an outer side of a corner of the anode current collector. As such, a layer of protection and isolation structure is added between the anode current collector and the laminated aluminum film, thereby greatly lowering the probability that the laminated aluminum film is punctured by the anode current collector.

It shall be appreciated that the above general description and the detailed description hereinafter are only illustrative but not for limiting the present application.

BRIEF DESCRIPTION OF THE DRAWINGS

FIG. 1 is a schematic structural diagram of a first side face and a second side face of a cathode sheet according to an embodiment of the present application, wherein an anti-puncture cushion 16 is fixed to a domain relative to a coating zone 102b on a tail exposed zone 104a;

FIG. 4 is a schematic structural diagram of a first side face and a second side face of a cathode sheet according to an embodiment of the present application, wherein the anti-puncture cushion 16 is fixed to a domain relative to a tail exposed zone 104b on the tail exposed zone 104a;

REFERENCE NUMERALS AND DENOTATIONS THEREOF

Figure 1:
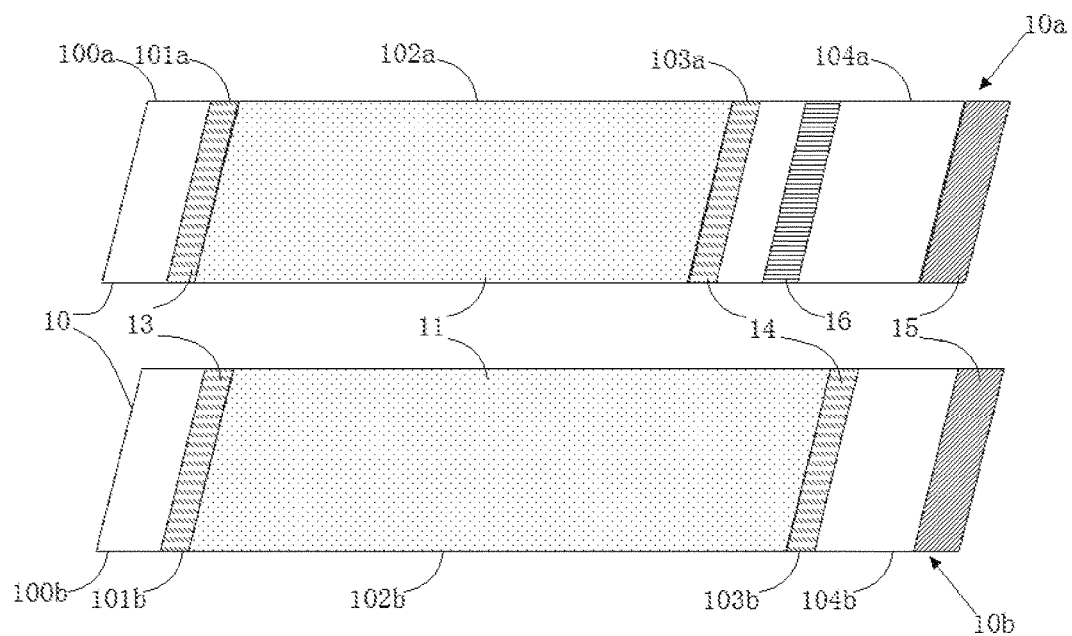

1-Cathode sheet
10-Cathode current collector
100a, 100b-Head exposed zones
101a, 101b-Head adhesive application zones
102a, 102b-Coating zones
103a, 103b-Tail adhesive application zones
104a, 104b-Tail exposed zones
11-Active substance layer
12-Cathode tab
13-Head protective adhesive
14-Tail protective adhesive,
15-Ending adhesive
16-Anti-puncture cushion 2-Anode sheet
3-Separator
4-Laminated aluminum film The accompanying drawings herein, which are incorporated into and constitute a part of the specification, illustrate embodiments consistent with the present application, and together with the specification, serve to explain the principles of the present application.

DETAILED DESCRIPTION

The present application is further described with reference to specific embodiments and accompanying drawings. The terms "front", "behind", "left", "right", "upper" and "lower" described in the present application are given with reference to the state where a lithium ion electric roll is disposed in the accompanying drawings.

An embodiment of the present application provide a lithium ion electric roll, wherein the lithium ion electric roll comprises a cathode sheet 1, an anode sheet 2, a separator 3, and a laminated aluminum film 4. The cathode sheet 1, the anode sheet 2, and the separator 3 form a bare electric roll by winding, and the laminated aluminum film 4 wraps the bare electric roll.

Figure 4:
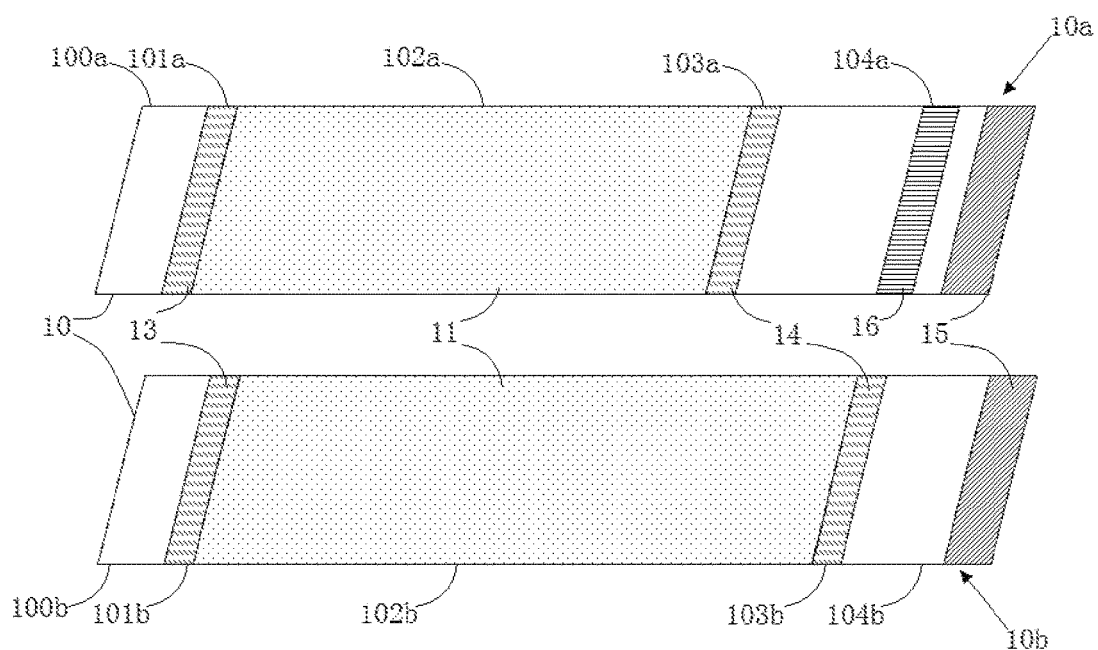
Figure 7:
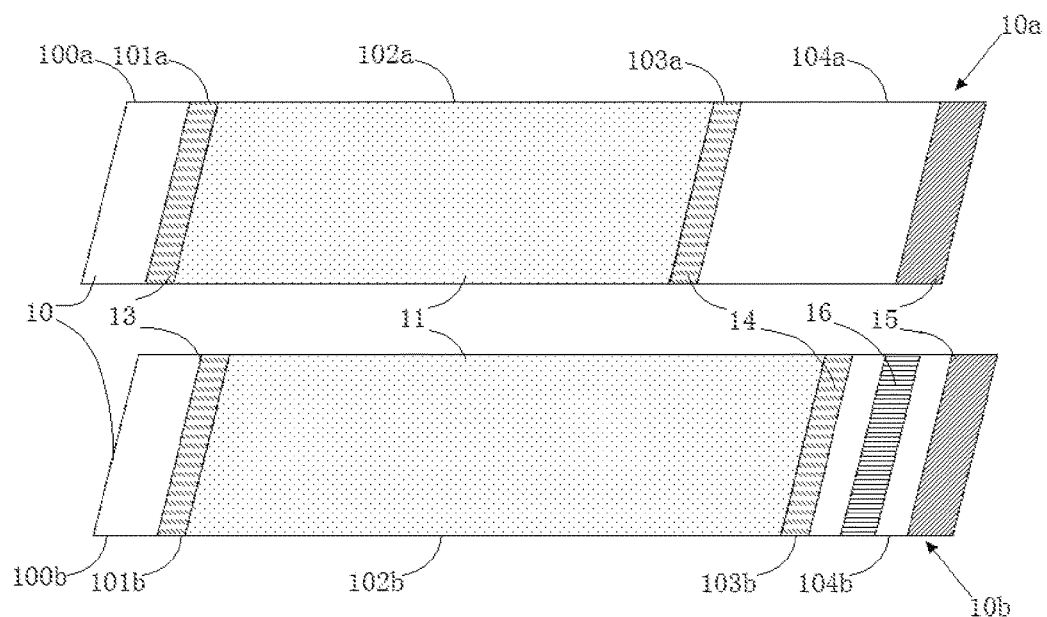
FIG. 7 is a schematic structural diagram of a first side face and a second side face of a cathode sheet according to an embodiment of the present application, wherein the anti-puncture cushion 16 is fixed to a domain relative the tail exposed zone 104b.

As illustrated in FIGS. 1 4, and 7, the cathode sheet 1 comprises a cathode current collector 10, an active substance layer 11, a cathode tab 12, a head protective adhesive 13, a tail protective adhesive 14, an ending adhesive 15, and an anti-puncture cushion 16.

The anode current collector 10 generally employs an aluminum foil. The cathode current collector 10 comprises a first side face 10a and a second side face 10b that deviate from each other. For ease of description, in this embodiment, two ends of the cathode current collector 10 along length directions of the first side face and the second side face are respectively defined as a head (left end portion in the drawings) and a tail (right end portion in the drawings).

From the head to the tail, the first side face 10a comprises a head exposed zone 100a, a head adhesive application zone 101a, a coating zone 102a, a tail adhesive application zone 103a, and a tail exposed zone 104a that are sequentially adjacent; and the second side face 10b comprises a head exposed zone 100b, a head adhesive application zone 101b, a coating zone 102b, a tail adhesive application zone 103b, and a tail exposed zone 104b that are sequentially adjacent. The head exposed zones 100a and 100b, and the head adhesive application zones 101a and 101b on two side faces of the cathode current collector 10 are all symmetrically arranged. The coating zones 102a and 102b on the two side faces of the bare electric roll 10 have the same starting position close to one end of the head of the cathode current collector 10. However, a length of the coating zone 102a is less than a length of the coating zone 102b. Meanwhile, a length of the tail exposed zone 103a is greater than a length of the tail exposed zone 103b.

Different zones of the cathode current collector 10 bear different functions. When the bare electric roll is formed through winding, the head exposed zones 100a and 100b and the head adhesive application zones 101a and 101b are located in a central area of the bare electric roll. Therefore, the cathode tab 12 is connected to a domain within the head adhesive application zone 102a or 102b of the cathode current collector 10, and the active substance layer 11 covers the surface of the coating zones 102a and 102b, which participates an electrochemical reaction and generates electric energy. The head protective adhesive 13 and the tail protective adhesive 14 are used to protect the active substance layer 11 from two sides thereof. The head protective adhesive 13 covers the head adhesive application zones 101a and 101b, and meanwhile covers the cathode tab 12. The tail protective adhesive 14 covers the tail adhesive application zones 103a and 103b. The ending adhesive 15 is bonded to a common tail of the tail exposed zones 104a and 104b.

When the bare electric roll is formed through winding, the anode sheet 2, the separator 3 and the cathode sheet 1 are arranged in a stacking manner, the first side face 10a faces towards the separator 3, and the outer side face of the bare electric roll is collaboratively formed by the ending adhesive 15 and a part of the tail exposed zone 104b. In this case, the tail of the cathode current collector 10 is bonded and fixed to the tail exposed zone 104b by using the ending adhesive 15.

Figure 10:
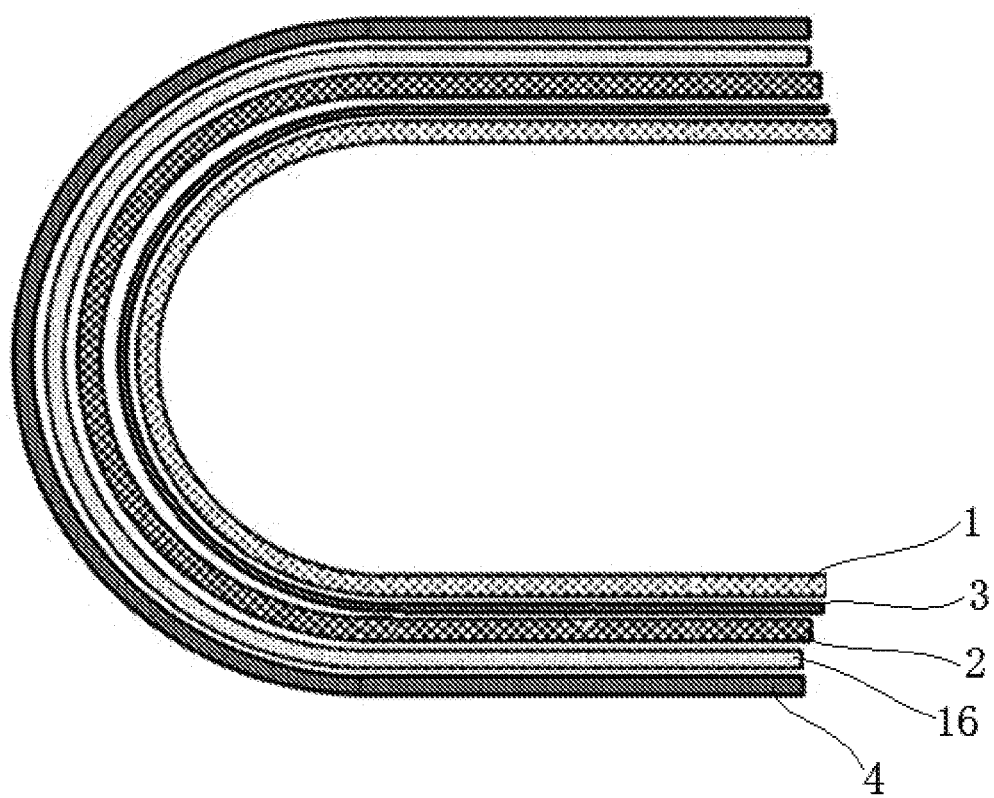
FIG. 10 is a schematic structural diagram of layers sandwiched within a lithium ion electric roll according to an embodiment of the present application.

The anti-puncture cushion 16 is connected to the tail exposed zone 104a or 104b, and extends along a width direction of the cathode current collector 10. The position of the anti-puncture cushion 16 may be determined according to the width of the anode current collector. However, to ensure the formation of the bare electric roll through winding, the anti-puncture cushion 16 is at least capable of staying on an outer side of one of two corners of the cathode current collector at the top and bottom of the bare electric roll, such that a layer of protection and isolation structure is formed between the corner of the anode current collector and the laminated aluminum film 4. With the presence of the protection and isolation structure, when the separator 3 is punctured by the anode current collector, the anode current collector is still capable of being isolated by the anti-puncture cushion 16, and thus is not in direct contact with the laminated aluminum film 4. In this way, the probability that the laminated aluminum film 4 is punctured is lowered (referring to FIG. 10).

Figure 2:
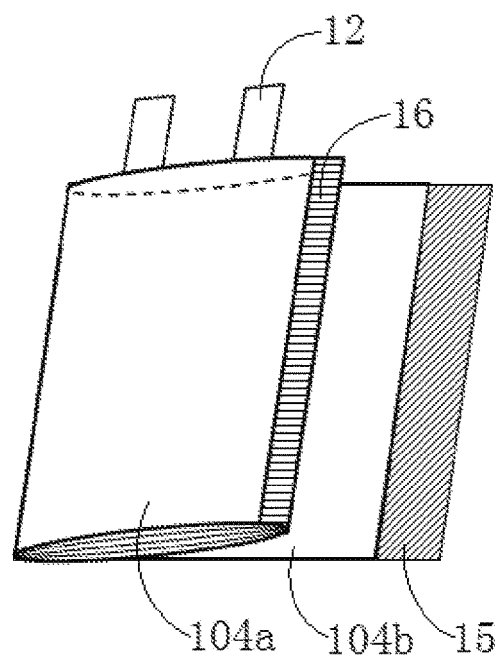
FIG. 2 is a schematic structural diagram of a non-edge banded bare electric roll formed through winding of the cathode sheet as illustrated in FIG. 1.
Figure 3:
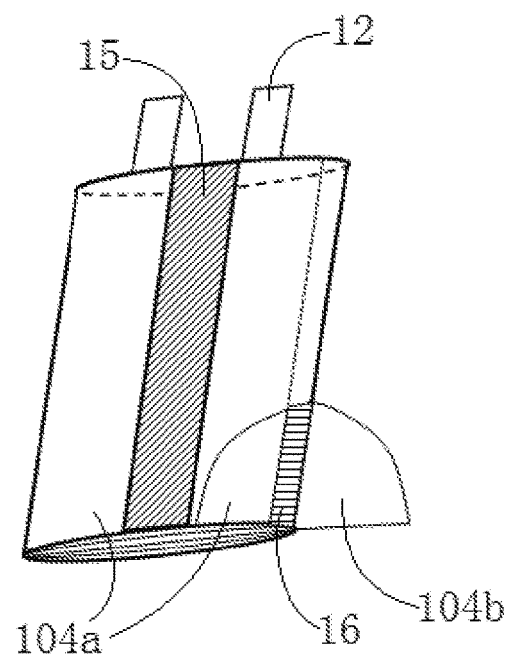
FIG. 3 is a schematic structural diagram of a partially-torn edge banded bare electric roll formed through winding of the cathode sheet as illustrated in FIG. 1.
Figure 5:
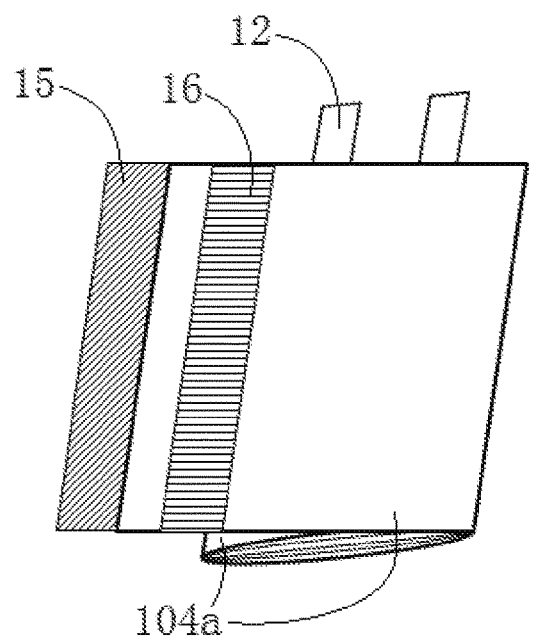
FIG. 5 is a schematic structural diagram of a non-edge banded bare electric roll formed through winding of the cathode sheet as illustrated in FIG. 4.
Figure 6:
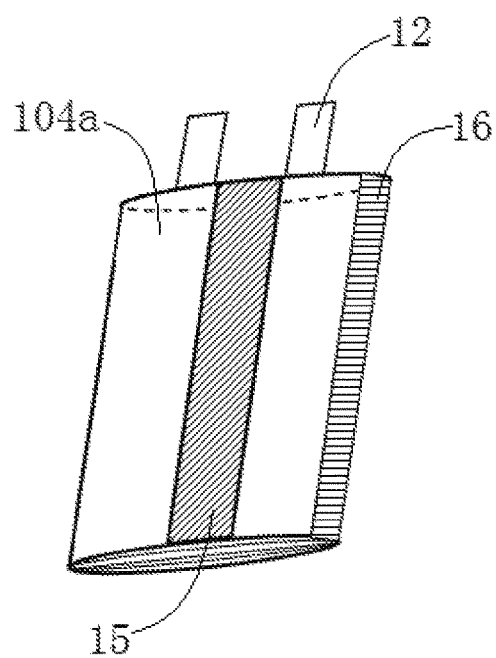
FIG. 6 is a schematic structural diagram of an edge banded bare electric roll formed through winding of the cathode sheet as illustrated in FIG. 4.
Figure 8:
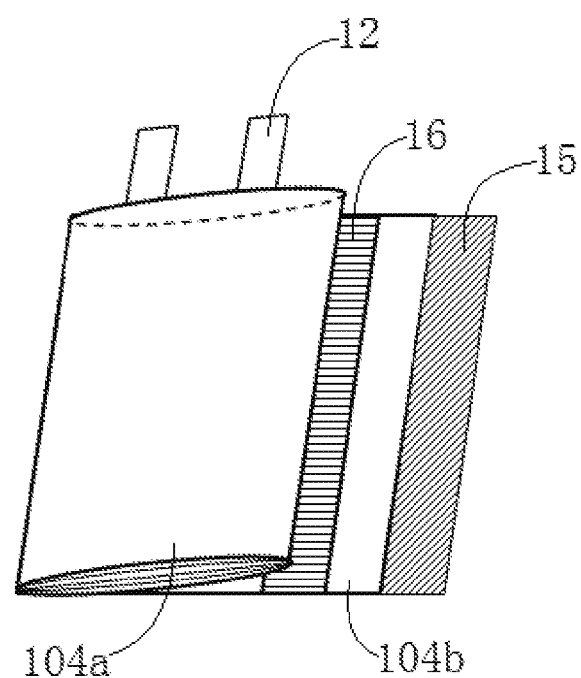
FIG. 8 is a schematic structural diagram of a non-edge banded bare electric roll formed through winding of the cathode sheet as illustrated in FIG. 7.
Figure 9:
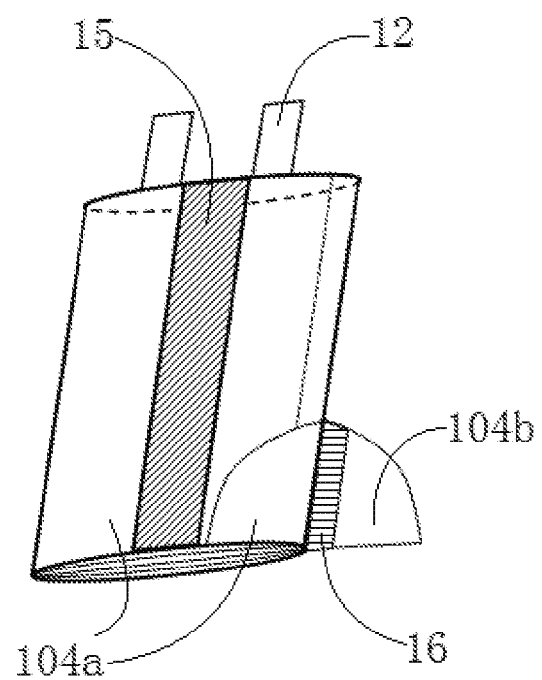
FIG. 9 is a schematic structural diagram of a partially-torn edge banded bare electric roll formed through winding of the cathode sheet as illustrated in FIG. 7.

In this embodiment, the anti-puncture cushion 16 may be connected to the tail exposed area 104a. Specifically, the tail exposed zone 104a simultaneously has an opposing portion with the coating zone 102b and the tail exposed zone 104b in projection of the cathode current collector 10. Therefore, in this case, two connection positions are available. As illustrated in FIG. 1, the first manner is to fix the anti-puncture cushion 16 to a domain relative to the coating zone 102b on the tail exposed zone 104a. As such, when the bare electric roll is formed through winding, the anti-puncture cushion 16 stays an outer side wall of a second layer of the bare electric roll in an outside-to-inside direction (referring to FIGS. 2 and 3). As illustrated in FIG. 4, the second manner is to fix the anti-puncture cushion 16 to a domain relative to the tail exposed zone 104b on the tail exposed zone 104a. As such, when the bare electric roll is formed through winding, the anti-puncture cushion 16 directly stays an outer side wall of a first layer (outermost layer) of the bare electric roll in an outside-to-inside direction (referring to FIGS. 5 and 6). In addition, as illustrated in FIG. 7, in this embodiment, the anti-puncture cushion 16 may be also connected to the tail exposed area 104b. When the bare electric roll is formed through winding, the anti-puncture cushion 16 stays on an inner side wall of the first layer of the bare electric roll in an outside-to-inside direction (referring to FIGS. 8 and 9). No matter which of the above three manners is used, the anti-puncture cushion 16 is capable of isolating the anode current collector from the laminated aluminum film 4.

In this embodiment, since the anode current collector is capable of simultaneously forming a corner at the top and bottom of the bare electric roll, to achieve overall protection, when the bare electric roll is formed through winding, it is preferable that the anti-puncture cushion 16 is capable of simultaneously staying on outer sides of two corners of the anode current collector.

The anti-puncture layer 16 may be connected to the cathode current collector 10 in a bonding manner. For example, an adhesive tape may be used as the anti-puncture cushion 16, and an adhesive face of the adhesive tape is directly bonded to the surface of the cathode current collector 10. During the bonding, a two-section type adhesive tape may be used to respectively isolate the two corners of the anode current collector, or an integral one-section adhesive tape may be used to simultaneously isolate the two corners of the anode current collector, which is simpler and more convenient. A type of a tape may be selected according to actual requirements. For example, a biaxially oriented polypropylene (BOPP) tape which is commonly used on the lithium ion battery is selected, for example, a green glue commonly known.

The probability that the laminated aluminum film is punctured by the anode current collector is significantly reduced by the lithium ion electric roll according to this embodiment.

Described above are merely preferred embodiments of the present application, but are not intended to limit the present application. A person skilled in the art may derive various modifications and variations. Any modification, equivalent replacement, or improvement made without departing from the spirit and principle of the present application should fall within the protection scope of the present application.

What is claimed is:

1. A cathode sheet, comprising a cathode current collector, an active substance layer, a cathode tab, a head protective adhesive, a tail protective adhesive, an ending adhesive, and an anti-puncture cushion; wherein the cathode current collector comprises a first side face and a second side face that deviate from each other, two ends along length directions of the first side face and the second side face being respectively a head and a tail;

from the head to the tail, both the first side face and the second side face comprise a head exposed zone, a head adhesive application zone, a coating zone, a tail adhesive application zone, and a tail exposed zone that are sequentially adjacent, the head exposed zone and the head adhesive application zone on two side faces of the cathode current collector being both symmetrically arranged, a length of the coating zone on the first side face being less than a length of the coating zone on the second side face, and a length of the tail exposed zone on the first side face being greater than a length of the tail exposed zone on the second side face;

the cathode tab is connected to a domain within the head adhesive application zone of the cathode current collector, the active substance layer covers the coating zone, the head protective adhesive covers the head adhesive application zone and covers the cathode tab, the tail protective adhesive covers the tail adhesive application zone, and the ending adhesive is bonded to a tail end of the tail exposed zone; and the anti-puncture cushion is connected to the tail exposed zone, and extends along a width direction of the cathode current collector; and when a bare electric roll is formed through winding, the anti-puncture cushion is at least capable of staying on an outer side of one corner of an anode current collector.

2. The cathode sheet according to claim 1, wherein the anti-puncture cushion is connected to a domain relative to the tail exposed zone on the first side face and the coating zone on the second side face; and when the bare electric roll is formed through winding, the anti-puncture cushion is capable of staying on an outer side wall of a second layer of the bare electric roll in an outside-to-inside direction.

3. The cathode sheet according to claim 1, wherein the anti-puncture cushion is connected to a domain relative to the tail exposed zone on the first side face and the tail exposed zone on the second side face; and when the bare electric roll is formed through winding, the anti-puncture cushion is capable of staying on an outer side wall of a first layer of the bare electric roll in an outside-to-inside direction.

4. The cathode sheet according to claim 1, wherein the anti-puncture cushion is connected to the second side face; and when the bare electric roll is formed through winding, the anti-puncture cushion is capable of staying on an inner side wall of a first layer of the bare electric roll in an outside-to-inside direction.

5. The cathode sheet according to claim 1, wherein the anti-puncture cushion is capable of staying on outer sides of two corners of an anode current collector when the bare electric roll is formed through winding.

6. The cathode sheet according to claim 5, wherein the anti-puncture cushion is bonded to the cathode current collector.

7. The cathode sheet according to claim 6, wherein the anti-puncture cushion comprises a section of adhesive tape.

8. The cathode sheet according to claim 6, wherein the anti-puncture cushion comprises two sections of adhesive tapes.

9. The cathode sheet according to claim 8, wherein the adhesive tape is a biaxially oriented polypropylene (BOPP) adhesive tape.

10. A lithium ion electric roll, comprising a laminated aluminum film, and a bare electric roll that is formed by winding an anode sheet, a separator and a cathode sheet according to claim 1; wherein
  in the electric roll, the anode sheet, the separator, and the cathode sheet are arranged in a stacking manner, and the first side face faces towards the separator, an outer side face of the bare electric roll being formed by the ending adhesive, and the tail exposed zone partially located on the second side face, and the anti-puncture cushion staying on an outer side of a corner the anode current collector; and
  the laminated aluminum film wraps the bare electric roll.

* * * * *